United States Patent
Furukawa et al.

(10) Patent No.: US 6,590,032 B2
(45) Date of Patent: Jul. 8, 2003

(54) THERMOPLASTIC RESIN COMPOSITION AND MOLDINGS THEREFROM

(75) Inventors: Haruhiko Furukawa, Chiba Prefecture (JP); Koji Shiromoto, Chiba Prefecture (JP); Hiroshi Ueki, Chiba Prefecture (JP); Yoshitsugu Morita, Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 23 days.

(21) Appl. No.: 09/829,607

(22) Filed: Apr. 10, 2001

(65) Prior Publication Data

US 2002/0040101 A1 Apr. 4, 2002

(30) Foreign Application Priority Data

Apr. 25, 2000 (JP) ........................................ 2000-123489

(51) Int. Cl.7 .............................................. C08L 83/10
(52) U.S. Cl. ...................... 525/106; 525/100; 524/506
(58) Field of Search ................................ 525/106, 100; 524/506

(56) References Cited

U.S. PATENT DOCUMENTS

| | | | |
|---|---|---|---|
| 4,535,106 A | * | 8/1985 | Abolins et al. .............. 524/151 |
| 5,708,085 A | * | 1/1998 | Hauenstein et al. ......... 525/106 |
| 5,725,469 A | * | 3/1998 | Mann et al. ................. 428/418 |
| 5,861,450 A | * | 1/1999 | Chen et al. .................. 524/269 |
| 6,277,908 B1 | * | 8/2001 | Yamamoto .................. 524/436 |

FOREIGN PATENT DOCUMENTS

WO  WO 99/42281  8/1999  ............. B32B/7/10

OTHER PUBLICATIONS abstract JP 63172757, 1988.*
Abstract, JP 60–76561 May 1, 1985.
Abstract, JP 9–40841 Feb. 10, 1997.
Abstract, JP 8–58043 Mar. 5, 1996.
Abstract, JP 11–35750 Feb. 9, 1999.
Abstract, JP 07245021, Sep. 19, 1995.
Abstract, JP 08090681, Apr. 9, 1996.
Abstract, JP 63172757, Sep. 16, 1988.
Abstract, JP 08301496, Nov. 19, 1996.

* cited by examiner

Primary Examiner—Margaret G. Moore
(74) Attorney, Agent, or Firm—Alan Zombeck

(57) ABSTRACT

A thermoplastic resin composition comprising
(A) 100 weight parts thermoplastic resin,
(B) 0.1 to 100 weight parts of a mixture of
  (b-1) thermoplastic resin and
  (b-2) polyorganosiloxane that has a viscosity at 25° C. of at least 1,000,000 mPa·s, and
(C) 0.1 to 100 weight parts polyorganosiloxane-bonded thermoplastic resin in which
  (c-1) thermoplastic resin and
  (c-2) polyorganosiloxane
are chemically bonded to each other.

19 Claims, No Drawings

THERMOPLASTIC RESIN COMPOSITION AND MOLDINGS THEREFROM

FIELD OF THE INVENTION

This invention relates to thermoplastic resin compositions. More particularly, this invention relates to a thermoplastic resin composition that exhibits an excellent moldability, an excellent surface lubricity, and an excellent scratch and mar resistance. This invention also relates to moldings comprising this thermoplastic resin composition.

BACKGROUND OF THE INVENTION

Thermoplastic resins offer the advantages of light weight and good corrosion resistance and as a consequence are used for interior and exterior components in automobiles and for the exterior components of household electrical appliances. However, these thermoplastic resins, and thermoplastic elastomers in particular, suffer from a poor surface lubricity and a poor wear or abrasion resistance, and it is fairly easy to scratch or mar the surface of moldings produced therefrom. In order to address these shortcomings in thermoplastic resins, quite a few compositions comprising polyorganosiloxane/thermoplastic elastomer blends have been disclosed. For example, Japanese Patent Application Laying Open Number Sho 60-76561 (76,561/1985) teaches a composition comprising the addition of silicone oil and polytetrafluoroethylene powder to polyolefin-type thermoplastic elastomer. This composition has an enhanced surface lubricity and an enhanced resistance to wear and abrasion. Japanese Patent Application Laying Open Number Hei 11-35750 (35,750/1999) teaches a composition comprising a blend of polyorganosiloxane having a viscosity of at least 100,000 centistokes in a polyolefin-type thermoplastic elastomer. Moldings obtained from the former composition, however, exhibit a number of drawbacks that derive from the fact that the silicone oil outmigrates to the surface thereof and the moldings can become sticky and they may suffer from a loss of aesthetics in their appearance due to an increased gloss. In addition, their surface lubricity can gradually decline during long-term use. In the case of the latter composition, it is difficult to achieve a uniform dispersion of the polyorganosiloxane in the polyolefin-type thermoplastic elastomer, which results in a poor blend stability. Moldings therefrom also suffer from a gradual decline in surface lubricity during long-term use. In addition, Japanese Patent Application Laying Open Number Hei 8-58043 (58,043/1996) teaches a composition obtained by blending polyolefin resin with calcium carbonate and organosiloxane-modified polyolefin resin. Japanese Patent Application Laying Open Number Hei 9-40841 (40,841/1997) teaches a composition comprising a blend of polyorganosiloxane-grafted acrylonitrile-styrene copolymer in acrylonitrile-butadiene-styrene copolymer (ABS resin). Unfortunately, moldings fabricated from these latter compositions suffer from an inadequate surface lubricity and scratch or mar resistance and as a result may not be fully satisfactory for some applications.

The object of this invention is to provide a thermoplastic resin composition that has an excellent moldability, an excellent surface lubricity, and an excellent scratch or mar resistance.

SUMMARY OF THE INVENTION

A thermoplastic resin composition comprising
(A) 100 weight parts thermoplastic resin,
(B) 0.1 to 100 weight parts of a mixture of
(b-1) thermoplastic resin and
(b-2) polyorganosiloxane that has a viscosity at 25° C. of at least 1,000,000 mPa·s, and
(C) 0.1 to 100 weight parts polyorganosiloxane-bonded thermoplastic resin in which
(c-1) thermoplastic resin and
(c-2) polyorganosiloxane
are chemically bonded to each other.
This invention also relates to moldings obtained by the molding or forming of the thermoplastic resin composition.

DESCRIPTION OF THE INVENTION

The present invention is a thermoplastic resin composition comprising
(A) 100 weight parts thermoplastic resin,
(B) 0.1 to 100 weight parts of a mixture of
(b-1) thermoplastic resin and
(b-2) polyorganosiloxane that has a viscosity at 25° C. of at least 1,000,000 mPa·s, and
(C) 0.1 to 100 weight parts polyorganosiloxane-bonded thermoplastic resin in which
(c-1) thermoplastic resin and
(c-2) polyorganosiloxane
are chemically bonded to each other.
This invention also relates to moldings obtained by the molding or forming of the present thermoplastic resin composition.

To explain the preceding in greater detail, the thermoplastic resin (A) may be any organic resin that, while occurring as a solid at ambient temperature, can undergo plastic deformation upon an increase in temperature. The type and other characteristics of this thermoplastic resin (A) are not otherwise critical. Within this broad range of permissible thermoplastic resins, the thermoplastic resins known as thermoplastic elastomers are preferred for (A). Thermoplastic elastomers are organic resins that exhibit rubbery elastic behavior at ambient temperature, but which can undergo plastic deformation upon an increase in temperature (see *Jitsuyo Purasuchikku Jiten* (English title: *The Practical Plastic Encyclopedia*), pages 180 to 207, published 1 May 1993 by Kabushiki Kaisha Sangyo Chosa-kai). These thermoplastic elastomers can be exemplified by polyolefin-type thermoplastic elastomers, polystyrene-type thermoplastic elastomers, polyamide-type thermoplastic elastomers, polyester-type thermoplastic elastomers, polyvinyl chloride-type thermoplastic elastomers, polyurethane-type thermoplastic elastomers, and fluoropolymer-type thermoplastic elastomers; among which the polyolefin-type thermoplastic elastomers, polystyrene-type thermoplastic elastomers, and polyester-type thermoplastic elastomers are preferred. The polyolefin-type thermoplastic elastomers are particularly preferred. The polyolefin-type thermoplastic elastomers include polymer copolymer-type thermoplastic elastomers and polymer blend-type thermoplastic elastomers in which the hard phase is polyethylene or polypropylene and the soft phase is EPDM, EPR, or butyl rubber. These polyolefin-type thermoplastic elastomers are available commercially under such product names, for example, as Mirastomer® and Goodmer, both from Mitsui Petrochemical Co., Ltd. The polystyrene-type thermoplastic elastomers include block polymer-type thermoplastic elastomers in which the hard phase is polystyrene and the soft phase is polybutadiene, polyisobutylene, or hydrogenated polybutadiene; these polystyrene-type thermoplastic elastomers are available commercially under such product names, for example, as Tuftec®, Tufprene®, Sorprene, and Asaprene®, all from Asahi Chemical. The polyester-type thermoplastic elastomers include block polymer-type thermoplastic elastomers in which the hard phase is polyester and the soft phase is polyether or polyester. These polyester-type thermoplastic elastomers are available commercially, for example, under the product name Hytrel® from Du Pont-Toray Co., Ltd. Component (A) can be a single thermoplastic resin or thermoplastic elastomer or can be a mixture of 2 or more. Component (A) preferably has a Rockwell hardness (R scale) at 25° C. no greater than 70 and preferably has a Shore D hardness (ASTM D2240) at 25° C. no greater than 45.

Component (B) is an essential component that imparts moldability and surface lubricity to the present composition. The thermoplastic resin (b-1) encompassed by component (B) can be exemplified by polyolefin resins such as polyethylene (PE), low-density polyethylene (LDPE), high-density polyethylene, ultrahigh molecular weight polyethylene (UHMPE), polypropylene (PP), polymethylpentene (MPX), ethylene-(meth)acrylate ester copolymers, and ethylene-vinyl acetate copolymers (EVA); acrylic-type vinyl resins such as polymethyl methacrylate (PMMA); styrene-type vinyl resins such as polystyrene (PS), high-impact polystyrene (HIPS), acrylonitrile-butadiene-styrene (ABS) copolymers, acrylonitrile-styrene (AS) copolymers, acrylonitrile-acrylic rubber-styrene (AAS) copolymers, and acrylonitrile-ethylene/propylene rubber-styrene (AES) copolymers; other vinyl resins such as polyvinyl acetate, polyvinyl chloride (PVC), polyvinylidene chloride (PVDC), polyvinyl alcohol (PVA), and polytetrafluoroethylene (PTFE); polyester resins such as polybutylene terephthalate (PBT) and polyethylene terephthalate (PET); polyamide resins such as nylon 6, nylon 66, nylon 610, nylon 11, and nylon 12; polyoxyalkylene resins such as polyacetal (POM); and other thermoplastic resins such as polycarbonates (PC), modified polyphenylene ethers (modified PPE), polyvinyl acetates (PVAC), polysulfones (PSU), polyethersulfones (PES), polyphenylene sulfides (PPS), polyarylates (PAR), polyamideimides (PAI), polyetherimides (PEI), polyetheretherketones (PEEK), polyimides (PI), and liquid-crystal polyesters (LCP), as well as copolymers of the preceding. Preferred among the preceding are thermoplastic resins that have a Rockwell hardness (R scale) at 25° C. of at least 80. In addition, component (b-2) need not be compatible with component (A) as long as it can be microscopically dispersed in component (A).

Component (b-2), which is the other component encompassed by component (B), is an essential component that imparts moldability and surface lubricity to the present composition. This component (b-2) must have a viscosity at 25° C. of at least 1,000,000 mPa·s and preferably has a viscosity of at least 5,000,000 mpa·s and more preferably of at least 10,000,000 mPa·s. Component (b-2) is preferably a gum with a Williams plasticity of at least 100, more preferably of at least 120, and most preferably of at least 150. Such a component (b-2) can be polyorganosiloxanes with the average unit formula $R^1_a SiO_{(4-a)/2}$ where $R^1$ is a monovalent hydrocarbyl or halogenated monovalent hydrocarbyl and $1.8 \leq a \leq 2.2$. The monovalent hydrocarbyl can be exemplified by alkyl such as methyl, ethyl, and propyl; cycloalkyl such as cyclopentyl and cyclohexyl; aryl such as phenyl and xylyl; and aralkyl such as benzyl, phenethyl, and 3-phenylpropyl. The halogenated hydrocarbyl can be exemplified by 3,3,3-trifluoropropyl and 3-chloropropyl. The polyorganosiloxane under consideration (b-2) can be specifically exemplified by polydimethylsiloxanes endblocked by trimethylsiloxy at both terminals, polydimethylsiloxanes endblocked by silanol at both terminals, polydimethylsiloxanes endblocked by silanol at only one terminal, polydimethylsiloxanes endblocked by methoxy at both terminals, dimethylsiloxane-methylphenylsiloxane copolymers endblocked by trimethylsiloxy at both terminals, dimethylsiloxane-methylphenylsiloxane copolymers endblocked by silanol at both terminals, dimethylsiloxane-diphenylsiloxane copolymers endblocked by trimethylsiloxy at both terminals, dimethylsiloxane-diphenylsiloxane copolymers endblocked by silanol at both terminals, and dimethylsiloxane-methyl(3,3,3-trifluoropropyl)siloxane copolymers endblocked by trimethylsiloxy at both terminals. In order to avoid staining of the mold or die during molding operations and prevent molding defects, component (b-2) preferably contains no more than 5,000 ppm and more preferably no more than 2,000 ppm low molecular weight organosiloxane having a vapor pressure greater than or equal to 10 mmHg at 200° C.

Component (B) is a mixture of the above-described components (b-1) and (b-2). The mixing proportions of components (b-1) and (b-2) should provide a component (b-2) content in component (B) of from 1 to 80 weight % and preferably from 20 to 80 weight %.

Component (B) is used at from 0.1 to 100 weight parts per 100 weight parts component (A) and is preferably used at from 0.1 to 50 weight parts and more preferably at from 0.1 to 25 weight parts per 100 weight parts component (A). No effect from the addition of component (B) is seen at a component (B) addition below 0.1 weight part, while the scratch or mar resistance declines at a component (B) addition in excess of 100 weight parts.

Component (C) functions to enable a uniform dispersion of component (B) in component (A) and through this action functions to impart surface lubricity and scratch/mar resistance to the present composition. Component (C) is a thermoplastic resin in which component (c-1) is chemically bonded to component (c-2). Component (c-1) can be exemplified by the same thermoplastic resins as provided above for component (b-1), among which thermoplastic resins having a Rockwell hardness (R scale) at 25° C. of at least 80 are preferred. The thermoplastic resins under consideration can be exemplified by polyolefin resins such as polypropylene resins and ethylene-propylene copolymers; polyamide resins such as nylon 6, nylon 66, and nylon 610; polyester resins such as polyethylene terephthalate and polybutylene terephthalate; aromatic polycarbonate resins; and polyacetal resins. Preferred among these examples are polyolefin resins such as polypropylene resins and ethylene-propylene copolymers.

Component (c-2) is the other component in component (C) and can be a polyorganosiloxane with average unit formula $R^1_a R^2_b SiO_{(4-a-b)/2}$ where $R_1$ is monovalent hydrocarbyl or halogenated monovalent hydrocarbyl, $R^2$ is $C_1$ to $C_{12}$ alkenyl, and a and b are positive numbers such that $0.0001 \leq a/b \leq 0.1000$ and $1.8 \leq a+b \leq 2.2$. The monovalent hydrocarbyl can be exemplified by alkyl such as methyl, ethyl, and propyl; cycloalkyl such as cyclopentyl and cyclohexyl; aryl such as phenyl and xylyl; and aralkyl such as benzyl, phenethyl, and 3-phenylpropyl. The halogenated hydrocarbyl can be exemplified by 3,3,3-trifluoropropyl and 3-chloropropyl. $R^2$ can be exemplified by vinyl, propenyl, butenyl, pentenyl, hexenyl, and decenyl with vinyl and hexenyl being preferred. Hexenyl is particularly preferred for the good reactivity it affords. The viscosity of this polydiorganosiloxane at 25° C. should be at least 1,000,000 mPa·s and is preferably at least 5,000,000 mPa·s and more preferably is at least 10,000,000 mPa·s. In order to avoid staining of the mold or die during molding operations and prevent molding defects, component (c-2) preferably contains no more than 5,000 ppm and more preferably no more than 2,000 ppm low molecular weight organosiloxane having a vapor pressure greater than or equal to 10 mmHg at 200° C. The polyorganosiloxane under consideration can be exemplified by polydimethylsiloxanes endblocked at both terminals by dimethylvinylsiloxy, polydimethylsiloxanes endblocked at both terminals by dimethylhexenylsiloxy, dimethylsiloxane-methylhexenylsiloxane copolymers endblocked at both terminals by silanol, dimethylsiloxane-methylvinylsiloxane copolymers endblocked by silanol at only a single terminal, dimethylsiloxane-methylvinylsiloxane copolymers endblocked at both terminals by methoxy, dimethylsiloxane-methylhexenylsiloxane copolymers endblocked by trimethylsiloxy at both terminals, and dimethylsiloxane-methylvinylsiloxane-methylphenylsiloxane copolymers endblocked at both terminals by trimethylsiloxy.

Component (C) can be synthesized, for example, by mixing component (c-1) with component (c-2) with heating (Japanese Laid Open (Kokai or Unexamined) Patent Application Number Hei 8-127660 (127,660/1996)). The reaction between components (c-1) and (c-2) can be promoted by the addition of those organoperoxides and inorganic peroxides familiar as radical generators. This mixing time is preferably from 1 minute up to 60 minutes. Mixing times longer than 60 minutes should be avoided because they can cause degradation of the thermoplastic resin. The mixing temperature should be in the range of from the melting point of the thermoplastic resin up to the decomposition temperature of the thermoplastic resin, and in general will be in the range from 140 to 260° C.

The ratio between components (c-1) and (c-2) should provide a component (c-2) content in component (C) of from 1 to 80 weight % and preferably from 20 to 80 weight % and more preferably from 30 to 70 weight %.

Component (C) should be present at from 0.1 to 100 weight parts per 100 weight parts component (A) and is preferably present at from 0.1 to 50 weight parts and more preferably at from 0.1 to 25 weight parts per 100 weight parts component (A). No effect from the addition of component (C) is seen at a component (C) addition below 0.1 weight part, while the scratch or mar resistance declines at a component (C) addition in excess of 100 weight parts.

While the present composition comprises components (A) through (C) as described above, it may also contain a plate- or flake-form inorganic filler (D) in order to improve rigidity and dimensional stability. Component (D) can be exemplified by talc, mica, clay, kaolin, hydrotalcite, vermiculite, smectite, and glass flake. Component (D) is preferably added at from 1 to 100 weight parts and more preferably at from 5 to 80 weight parts for each 100 weight parts component (A).

The present composition may also contain an oxidation inhibitor at from 0.1 to 5 weight parts and preferably 0.1 to 2 weight parts oxidation inhibitor for each 100 weight parts of the composition. This oxidation inhibitor can be, for example, a hindered phenol or a hindered amine. The present composition may additionally contain epoxy resin, for example, a bisphenol A epoxy resin, at from 0.1 to 5 weight parts and preferably 0.2 to 3 weight parts epoxy resin for each 100 weight parts of the composition. The epoxy resin is used when it becomes necessary to prevent the diminution in activity caused by additive adsorption, for example, adsorption of the oxidation inhibitor by the inorganic filler.

The present composition may also contain, insofar as the object of the invention is not impaired, various other additives known for admixture into thermoplastic resin compositions. These additives include granular and irregularly shaped inorganic fillers such as calcium carbonate, barium sulfate, titanium oxide, zinc oxide, iron oxide, aluminum oxide, silicon dioxide, magnesium hydroxide, aluminum hydroxide, and carbon black; needle-shaped inorganic fillers such as wollastonite, potassium titanate, and magnesium sulfate; fibrous inorganic fillers such as glass fiber and carbon fiber; as well as UV absorbers; photostabilizers; heat stabilizers; plasticizers; blowing agents; crystal nucleating agents; lubricants; antistatics; agents that impart electrical conductivity; colorants such as dyes and pigments; compatibilizers; crosslinkers; flame retardants; antimolds; shrinkage reducers; thickeners; release agents; anticlouding agents; blueing agents; and silane coupling agents.

The present composition can be prepared simply by mixing components (A) to (C) to homogeneity. The apparatuses used for this preparation can be exemplified by Banbury mixers, kneader mixers, two-roll mills, and continuous compounding extruders.

The usual and well-known molding technologies can be used to produce moldings from the present composition, for example, injection molding, extrusion molding, and compression molding.

The present composition as described hereinabove is highly moldable and produces moldings that exhibit an excellent surface lubricity and an excellent resistance to scratching and marring. The present composition is therefore well-suited for application in those fields where such features are critical, for example, for interior and exterior automotive components such as door trim, console panels, instrument panels, and weather stripping, and for the exterior elements of household electrical appliances.

This invention will now be explained in greater detail in the following working examples. Parts in the working and comparative examples denotes weight parts. The values reported in the examples for the viscosity, Rockwell hardness, and Williams plasticity were measured at 25° C. The Williams plasticity of the polyorganosiloxanes was measured by the method described below. Also described below are the methods used to evaluate (i) mold staining during molding, (ii) molded article appearance, (iii) scratch resistance, (iv) the appearance of the molding surface after durability testing, and (v) surface lubricity.

Measurement of the Williams plasticity

The Williams plasticity was measured according to the method described in JIS K6249:1997, "Testing method for uncured and cured silicone rubbers". Specifically, 4.2 g of the polyorganopolysiloxane was made into a cylindrical test specimen; the test specimen was sandwiched between cellophane paper sheets and then placed in a dial gauge-equipped parallel plate plastometer (Williams plastometer from Ueshima Seisakusho Co., Ltd.); a load of 5 kg was applied; and after standing for 2 minutes the scale on the dial gauge was read to the millimeter level and the thickness of the test specimen was recorded. This numerical value was multiplied by 100 to obtain the value of the Williams plasticity.

Mold Staining During Molding and Molded Article Appearance

The thermoplastic resin composition was molded into a round plate using an injection molder. After the molding operation, the appearance of the surface of the mold and the appearance of the surface of the molded article were both evaluated by visual inspection.

Determination of Scratch Resistance

The scratch resistance was measured using a thrust friction wear tester from Toyo Seiki Seisakusho. A plate was first molded from the thermoplastic resin composition using an injection molder. Onto the surface of this plate was set a cylindrical stainless steel element that carried a nail-like projection whose end was rounded to a radius of 2 mm. After displacement of this element at a velocity of 2 cm/s under a load of 250 g/cm$^2$, the surface of the molding was inspected for the appearance of any scratching. This surface inspection was carried out by photographing the surface of the plate while exposing it to light from a fluorescent lamp at a 45° angle of incidence. The resulting photograph was visually inspected in order to determine the presence/absence of scratching on the plate surface. The data are reported as relative values using 100 as the pre-test value.

Evaluation of the appearance of the molding surface after durability testing The molded plate used in measurement of the scratch resistance was held for 200 hours in an oven maintained at 50° C., after which period of time it was removed and its surface was visually evaluated. A score of "glossy" was rendered when gloss had been produced due to bleed out by the silicone component; a score of "nonglossy" was rendered in the absence of this gloss.

Surface Lubricity

The surface lubricity was evaluated through measurement of the dynamic coefficient of friction (COF) of a molding fabricated from the thermoplastic resin composition. Cylindrical moldings were fabricated from polypropylene resin (MI (230° C., 2.16 kgf)=11 g/10 min) and the thermoplastic resin composition using an injection molder. Using these moldings as test specimens, the dynamic COF was measured by friction testing under a load of 250 g/cm$^2$ at a velocity of 2 cm/s.

REFERENCE EXAMPLE 1

Preparation of polydimethylsiloxane/polypropylene resin mixture (X-1). The following were introduced into a Laboplasto mill and were intermixed for 10 minutes at 210° C.: 50 parts polypropylene resin (Grand Polypro J108M from Grand Polymer Co., Ltd., Rockwell hardness (R scale) =110) and 50 parts polydimethylsiloxane (S1) endblocked at both terminals by trimethylsiloxy (viscosity=20,000,000 mPa·s, Williams plasticity=150, content of low molecular weight dimethylsiloxane=500 ppm). Cooling after mixing gave a thermoplastic resin composition (X-1) as a white solid.

REFERENCE EXAMPLE 2

Preparation of polydimethylsiloxane/polypropylene resin mixture (X-2). The following were introduced into a Laboplasto mill and were intermixed for 10 minutes at 210° C.: 60 parts of the polypropylene resin described in Reference Example 1 and 40 parts polydimethylsiloxane endblocked at both terminals with trimethylsiloxy (viscosity=6,000,000 mPa·s, Williams plasticity=110, content of low molecular weight dimethylsiloxane=100 ppm). Cooling after mixing gave thermoplastic resin composition (X-2) as a white solid.

REFERENCE EXAMPLE 3

Preparation of polydimethylsiloxane/nylon resin mixture (X-3). The following were introduced into a Laboplasto mill and were intermixed for 10 minutes at 210° C.: 50 parts nylon 6 resin (Amilan C1017 from Toray Industries Inc., Rockwell hardness (R scale)=115) and 50 parts polydimethylsiloxane (S1) endblocked at both terminals by trimethylsiloxy (viscosity=20,000,000 mPa·s, Williams plasticity= 150, content of low molecular weight dimethylsiloxane=500 ppm). Cooling after mixing gave thermoplastic resin composition (X-3) as a white solid.

REFERENCE EXAMPLE 4

Preparation of polydimethylsiloxane-bonded polypropylene resin (Y-1). The following were introduced into a Laboplasto mill and were intermixed for 10 minutes at 21° C.: 60 parts oxidation inhibitor-free polypropylene resin (MI (230° C., 2.16 kgf) 8 g/10 min, Rockwell hardness (R scale)=105) and 40 parts dimethylsiloxane-methylvinylsiloxane copolymer endblocked at both terminals by dimethylvinylsiloxy (viscosity=20,000,000 mPa·s, dimethylsiloxane unit: methylvinylsiloxane unit molar ratio =99.4:0.6). This was followed by the addition of 0.3 part 2,6-di-tert-butyl-4-methylphenol and mixing for 2 minutes. Cooling after mixing gave polydimethylsiloxane-bonded polypropylene resin (Y-1) as a white solid.

REFERENCE EXAMPLE 5

Preparation of polydimethylsiloxane-bonded polypropylene resin (Y-2). The following were introduced into a Laboplasto mill and were intermixed for 10 minutes at 210° C.: 60 parts oxidation inhibitor-free polypropylene-polyethylene copolymer (MI (230° C., 2.16 kgf)=3 g/10 min, Rockwell hardness (R scale)=90) and 40 parts dimethylsiloxane-methylhexenylsiloxane copolymer endblocked at both terminals by dimethylvinylsiloxy (viscosity =20,000,000 mPa·s, dimethylsiloxane unit: methylhexenylsiloxane unit molar ratio =99.4:0.6). This was followed by the addition of 0.3 part 2,6-di-tert-butyl-4-methylphenol and mixing for 2 minutes. Cooling after mixing gave polydimethylsiloxane-bonded polypropylene resin (Y-2) as a white solid.

EXAMPLE 1

The following were introduced into a Laboplasto mill and were intermixed with heating at 100 rpm and 210° C.: 100 parts polyolefin-type thermoplastic elastomer (Mirastomer® 9070N from Mitsui Petrochemical Co., Ltd., Shore D hardness (ASTM D2240)=30 to 40), 5 parts of the polydimethylsiloxane/polypropylene resin mixture (X-1) synthesized in Reference Example 1, 5 parts of the polydimethylsiloxane-bonded polypropylene resin (Y-1) synthesized in Reference Example 4, and 30 parts talc. Mixing was followed by cooling and discharge of a thermoplastic resin composition as a solid. This thermoplastic resin composition was molded using an injection molder and the properties of the resulting moldings were measured. The results are reported in Table 1.

EXAMPLE 2

The following were introduced into a Laboplasto mill and were intermixed with heating at 100 rpm and 210° C.: 100 parts polyolefin-type thermoplastic elastomer (Mirastomer® 9070N from Mitsui Petrochemical Co., Ltd.), 5 parts of the polydimethylsiloxane/polypropylene resin mixture (X-2) synthesized in Reference Example 2, 5 parts of the polydimethylsiloxane-bonded polypropylene resin (Y-2) synthesized in Reference Example 5, and 30 parts talc. Mixing was followed by cooling and discharge of a thermoplastic resin composition as a solid. This thermoplastic resin composition was molded using an injection molder and the properties of the resulting moldings were measured. The results are reported in Table 1.

EXAMPLE 3

The following were introduced into a Laboplasto mill and were intermixed with heating at 100 rpm and 210° C.: 100 parts polyolefin-type thermoplastic elastomer (Mirastomer® 9070N from Mitsui Petrochemical Co., Ltd.), 5 parts of the polydimethylsiloxane/nylon 6 resin mixture (X-3) synthesized in Reference Example 3, 5 parts of the polydimethylsiloxane-bonded polypropylene resin (Y-1) synthesized in Reference Example 4, and 30 parts talc. Mixing was followed by cooling and discharge of a thermoplastic resin composition as a solid. This thermoplastic resin composition was molded using an injection molder and the properties of the resulting moldings were measured. The results are reported in Table 1.

EXAMPLE 4

The following were introduced into a Laboplasto mill and were intermixed with heating at 100 rpm and 210° C.: 80 parts polyolefin-type thermoplastic elastomer (Mirastomer® 9070N from Mitsui Petrochemical Co., Ltd.), 5 parts of the polydimethylsiloxane/polypropylene resin mixture (X-1) synthesized in Reference Example 1, 20 parts styrene-type thermoplastic elastomer (Tuftec® H1052 from Asahi Chemical), 5 parts of the polydimethylsiloxane-bonded polypropylene resin (Y-1) synthesized in Reference Example 4, and 30 parts talc. Mixing was followed by cooling and discharge of a thermoplastic resin composition as a solid. This thermoplastic resin composition was molded using an injection molder and the properties of the resulting moldings were measured. The results are reported in Table 1.

COMPARATIVE EXAMPLE 1

The following were introduced into a Laboplasto mill and were intermixed with heating at 100 rpm and 210° C.: 100 parts polyolefin-type thermoplastic elastomer (Mirastomer® 9070N from Mitsui Petrochemical Co., Ltd.), 2.5 parts of the polydimethylsiloxane (S 1) described in Reference Example 1, 5 parts of the polydimethylsiloxane-bonded polypropylene resin (Y-1) synthesized in Reference Example 4, and 30 parts talc. Mixing was followed by cooling and discharge of a thermoplastic resin composition as a solid. This thermoplastic resin composition was molded using an injection molder and the properties of the resulting moldings were measured. The results are reported in Table 2.

COMPARATIVE EXAMPLE 2

The following were introduced into a Laboplasto mill and were intermixed with heating at 100 rpm and 210° C.: 100 parts polyolefin-type thermoplastic elastomer (Mirastomer® 9070N from Mitsui Petrochemical Co., Ltd.), 2.5 parts polydimethylsiloxane (S2) endblocked by trimethylsiloxy at both terminals (viscosity=20,000,000 mPa·s, content of low molecular weight dimethylsiloxane =30,000 ppm), and 30 parts talc. Mixing was followed by cooling and discharge of a thermoplastic resin composition as a solid. This thermoplastic resin composition was molded using an injection molder and the properties of the resulting moldings were measured. The results are reported in Table 2.

EXAMPLE 5

A thermoplastic resin composition was prepared by introducing the following into a compounding extruder and mixing to homogeneity at 210° C.: 100 parts polyolefin-type thermoplastic elastomer (Mirastomer® 8032N from Mitsui Petrochemical Co., Ltd.), 20 parts of the polydimethylsiloxane/polypropylene resin mixture (X-1) synthesized in Reference Example 1, and 20 parts of the polydimethylsiloxane-bonded polypropylene resin (Y-1) synthesized in Reference Example 4. The resulting thermoplastic resin composition was molded into a tubular molding by introduction into and processing by an extrusion molder set up for tube molding. The properties of the resulting tube were measured, and the results are reported in Table 3.

EXAMPLE 6

A thermoplastic resin composition was prepared by introducing the following into a compounding extruder and mixing to homogeneity at 210° C.: 100 parts polyolefin-type thermoplastic elastomer (Mirastomer® 8032N from Mitsui Petrochemical Co., Ltd.), 20 parts of the polydimethylsiloxane/polypropylene resin mixture (X-2) synthesized in Reference Example 2, and 20 parts of the polydimethylsiloxane-bonded polypropylene resin (Y-2) synthesized in Reference Example 5. The resulting thermoplastic resin composition was molded into a tubular molding by introduction into and processing by an extrusion molder set up for tube molding. The properties of the resulting tube were measured, and the results are reported in Table 3.

COMPARATIVE EXAMPLE 3

A thermoplastic resin composition was prepared by introducing the following into a compounding extruder and mixing to homogeneity at 210° C.: 100 parts polyolefin-type thermoplastic elastomer (Mirastomer® 8032N from Mitsui Petrochemical Co., Ltd.) and 20 parts of the polydimethylsiloxane-bonded polypropylene resin (Y-1) synthesized in Reference Example 4. The resulting thermoplastic resin composition was molded into a tubular molding by introduction into and processing by an extrusion molder set up for tube molding. The properties of the resulting tube were measured, and the results are reported in Table 3.

COMPARATIVE EXAMPLE 4

A thermoplastic resin composition was prepared by introducing the following into a compounding extruder and mixing to homogeneity at 210° C.: 100 parts polyolefin-type thermoplastic elastomer (Mirastomer® 8032N from Mitsui Petrochemical Co., Ltd.) and 10 parts of the polydimethylsiloxane (S1) described in Reference Example 1. The resulting thermoplastic resin composition was molded into a tubular molding by introduction into and processing by an extrusion molder set up for tube molding. The properties of the resulting tube were measured, and the results are reported in Table 3.

TABLE 1

| composition and properties measured | Examples | | | |
| --- | --- | --- | --- | --- |
| | Example 1 | Example 2 | Example 3 | Example 4 |
| component (A) | | | | |
| polyolefin-type thermoplastic elastomer (parts) | 100 | 100 | 100 | 80 |
| polystyrene-type thermoplastic elastomer (parts) | | | | 20 |
| component (B) | | | | |
| X-1 (parts) | 5 | | | 5 |
| X-2 (parts) | | 5 | | |
| X-3 (parts) | | | 5 | |

TABLE 1-continued

| composition and properties measured | Examples | | | |
|---|---|---|---|---|
| | Example 1 | Example 2 | Example 3 | Example 4 |
| component (C) | | | | |
| Y-1 (parts) | 5 | | 5 | 5 |
| Y-2 (parts) | | 5 | | |
| other additive | | | | |
| talc (parts) | 30 | 30 | 30 | 30 |
| appearance of the mold | excellent, uniform | excellent | excellent | excellent |
| appearance of the surface of the molded article | uniform | uniform | uniform | uniform |
| appearance of the molding surface after durability testing | nonglossy | nonglossy | nonglossy | nonglossy |
| surface lubricity | 0.22 | 0.23 | 0.22 | 0.22 |
| scratch resistance | no scratching | no scratching | no scratching | no scratching |

TABLE 2

| composition and properties measured | Comparative Examples | |
|---|---|---|
| | Comparative Example 1 | Comparative Example 2 |
| component (A) | | |
| polyolefin-type thermoplastic elastomer (parts) | 100 | 100 |
| component (B) | | |
| S1 (viscosity = 20,000,000 mPa · s, 500 ppm low molecular weight material) (parts) | 2.5 | |
| S2 (viscosity = 20,000,000 mPa · s, 30,000 ppm low molecular weight material) (parts) | | 2.5 |
| component (C) | | |
| Y-1 (parts) | | 5 |
| Y-2 (parts) | | |
| other additive | | |
| talc (parts) | 30 | 30 |
| appearance of the surface of the molded article | delamination occurred | delamination occurred, silver streaking staining occurred |
| appearance of the mold | uniform | glossy |
| appearance of the molding surface after durability testing | nonglossy | glossy |
| surface lubricity | 0.27 | 0.28 |
| scratch resistance | scratching occurred | scratching occurred |

TABLE 3

| composition and properties measured | Example Number | | | |
|---|---|---|---|---|
| | Example 5 | Example 6 | Comparative Example 3 | Comparative Example 4 |
| component (A) | | | | |
| polyolefin-type thermoplastic elastomer (parts) | 100 | 100 | 100 | 100 |
| component (B) | | | | |
| X-1 (parts) | 20 | | | |
| X-2 (parts) | | 20 | | |
| S1 (viscosity = 20,000,000 mPa · s, 30,000 ppm low molecular weight material) (parts) | | | 10 | 10 |
| component (C) | | | | |
| Y-1 (parts) | 20 | | 20 | |
| Y-2 (parts) | | 20 | | |
| appearance of the surface of the molded article | uniform | uniform | delamination occurred | delamination occurred |
| appearance of the molding surface after durability testing | nonglossy | nonglossy | nonglossy | glossy |

What is claimed is:

1. A thermoplastic resin composition comprising
   (A) 100 weight parts of a thermoplastic resin having a Shore D hardness (ASTM D2240) at 25° C. no greater than 45,
   (B) 0.1 to 100 weight parts of a mixture of
      (b-1) thermoplastic resin and
      (b-2) polyorganosiloxane that has a viscosity at 25° C. of at least 1,000,000 mPa·s, and
   (C) 0.1 to 100 weight parts polyorganosiloxane-bonded thermoplastic resin in which
      (c-1) thermoplastic resin and
      (c-2) polyorganosiloxane are chemically bonded to each other.

2. The thermoplastic resin composition of claim 1, where component (A) is a thermoplastic elastomer.

3. The thermoplastic resin composition of claim 1, where component (A) is a polyolefin-type thermoplastic elastomer.

4. The thermoplastic resin composition of claim 1, where component (A) has a Rockwell hardness (R scale) at 25° C. no greater than 70.

5. The thermoplastic resin composition of claim 1, where component (b-1) has a Rockwell hardness (R scale) at 25° C. of at least 80.

6. The thermoplastic resin composition of claim 1, where component (b-2) has a viscosity at 25° C. of at least 10,000,000 mPa·s.

7. The thermoplastic resin composition of claim 1, where component (b-2) contains no more than 5,000 weight-ppm low molecular weight organosiloxane that has a vapor pressure ≧10 mmHg at 200° C.

8. The thermoplastic resin composition of claim 1, where component (b-2) contains no more than 2,000 weight-ppm low molecular weight organosiloxane that has a vapor pressure ≧10 mmHg at 200° C.

9. The thermoplastic resin composition of claim 1, where component (B) contains from 1 weight % to 80 weight % component (b-2).

10. The thermoplastic resin composition of claim 1, where component (B) contains from 20 weight % to 80 weight % component (b-2).

11. The thermoplastic resin composition of claim 1 comprising 0.1 to 25 weight parts component (B) per 100 weight parts component (A).

12. The thermoplastic resin composition of claim 1, where component (c-1) has a Rockwell hardness (R scale) at 25° C. of at least 80.

13. The thermoplastic resin composition of claim 1, where component (c-1) is a polyolefin resin.

14. The thermoplastic resin composition of claim 1, where component (c-2) is an alkenyl-functional polyorganopolysiloxane.

15. The thermoplastic resin composition of claim 1, were component (c-2) has a viscosity at 25° C. of a least 10,000,000 mPa·s.

16. The thermoplastic resin composition of claim 1, where component (C) comprises from 1 to 80 weight % component (c-2).

17. The thermoplastic resin composition of claim 1, where component (c-2) contains no more than 2,000 ppm low molecular weight organosiloxane having a vapor pressure greater than or equal to 10 mmHg at 200° C.

18. The thermoplastic resin composition of claim 1 further comprising (D) an inorganic filler in plate or flake form.

19. A molding made by molding a thermoplastic resin composition comprising
- (A) 100 weight parts of a thermoplastic resin having a Shore D hardness (ASTM D2240) at 25° C. no greater than 45,
- (B) 0.1 to 100 weight parts of a mixture of
  - (b-1) thermoplastic resin and
  - (b-2) polyorganosiloxane that has a viscosity at 25° C. of at least 1,000,000 mPa·s, and
- (C) 0.1 to 100 weight parts polyorganosiloxane-bonded thermoplastic resin in which
- (c-1) thermoplastic resin and
- (c-2) polyorganosiloxane are chemically bonded to each other.

* * * * *